United States Patent
Tseng

(10) Patent No.: US 8,500,081 B2
(45) Date of Patent: Aug. 6, 2013

(54) SEAT TUBE OF A BICYCLE

(75) Inventor: Peng-Yu Tseng, Taipei (TW)

(73) Assignees: Peng-Yu Tseng, Taipei (TW); Kuni Tseng, Taipei (TW)

( * ) Notice: Subject to any disclaimer, the term of this patent is extended or adjusted under 35 U.S.C. 154(b) by 329 days.

(21) Appl. No.: 12/543,748

(22) Filed: Aug. 19, 2009

(65) Prior Publication Data
US 2011/0042543 A1    Feb. 24, 2011

(51) Int. Cl.
*F16M 11/00* (2006.01)
(52) U.S. Cl.
USPC ............ 248/412; 248/413; 248/405; 280/274
(58) Field of Classification Search
USPC ................ 248/503.1, 419, 420, 125.8, 354.4, 248/161, 125.1, 231.21, 231.31, 316.4, 405, 248/407, 410, 411, 412, 413; 411/75, 76, 411/77, 78, 79; 297/195.1, 215.14; 280/274, 280/281.1, 288.4
See application file for complete search history.

(56) References Cited

U.S. PATENT DOCUMENTS

| | | | | | |
|---|---|---|---|---|---|
| 4,354,399 | A | * | 10/1982 | Katayama | 74/551.1 |
| 5,201,242 | A | * | 4/1993 | Chi | 74/551.1 |
| 5,297,445 | A | * | 3/1994 | Chen | 74/551.3 |
| 5,330,302 | A | * | 7/1994 | Chen | 411/79 |
| 5,477,747 | A | * | 12/1995 | Cheng | 74/551.1 |
| 5,536,102 | A | * | 7/1996 | Kao | 403/320 |
| 5,540,457 | A | * | 7/1996 | Johnson | 280/279 |
| 5,562,359 | A | * | 10/1996 | Marui | 403/378 |
| 5,618,052 | A | * | 4/1997 | Rendall | 280/288.4 |
| 5,988,573 | A | * | 11/1999 | Mueller | 248/177.1 |
| 6,955,371 | B2 | * | 10/2005 | French | 280/279 |
| 7,562,932 | B2 | * | 7/2009 | Chiang | 297/195.1 |
| 7,997,645 | B2 | * | 8/2011 | Tseng | 297/215.15 |
| 8,020,828 | B2 | * | 9/2011 | Carnevali | 248/412 |
| 2010/0237668 | A1 | * | 9/2010 | Tseng | 297/195.1 |
| 2012/0027510 | A1 | * | 2/2012 | Chen | 403/374.2 |

\* cited by examiner

*Primary Examiner* — Terrell McKinnon
*Assistant Examiner* — Eret McNichols
(74) *Attorney, Agent, or Firm* — patenttm.us

(57) ABSTRACT

A seat tube of a bicycle has a tubular body and a tightening block. The tubular body has an insertion hole and a stationary block. The insertion hole is defined in the tubular body and has an inner surface and a tightening recess. The inner surface is formed in the tubular body. The tightening recess is defined in the inner surface. The stationary block is embedded in the tightening recess and has an oblique surface and a fastener hole. The fastener hole is defined in the oblique surface. The tightening block is mounted slidably on the oblique surface and has a tightening surface, a through hole and a fastener. The tightening surface is shaped to correspond to the inner surface. The through hole is defined through the tightening block. The fastener is mounted through the through hole and engages the fastener hole.

4 Claims, 5 Drawing Sheets

SEAT TUBE OF A BICYCLE

BACKGROUND OF THE INVENTION

1. Field of the Invention

The present invention relates to a seat tube of a bicycle, and more particularly to a seat tube having a device for adjusting a height of a saddle of a bicycle.

2. Description of Related Art

A seat post is connected between a seat tube and a saddle, so a height of the saddle can be adjusted by sliding the seat post relative to the seat tube.

In order to hold the seat post in position relative to the seat tube, the seat tube has a top end, two fastening rings and a slit. The fastening rings protrude from the top end of the seat tube. The slit is defined in the top end of the seat tube between the fastening rings. When fasteners are tightened against the fastening rings, the slit is narrowed to hold the seat post in position.

However, with the fastening rings and the fasteners protruding from the seat post, users are easily injured by the fastening rings and fasteners.

To overcome the shortcomings, the present invention tends to provide a seat tube of a bicycle to mitigate or obviate the aforementioned problems.

SUMMARY OF THE INVENTION

A seat tube of a bicycle has a tubular body and a tightening block. The tubular body has an insertion hole and a stationary block. The insertion hole is defined in the tubular body and has an inner surface and a tightening recess. The inner surface is formed in the tubular body.

The tightening recess is defined in the inner surface and has a bottom end formed on the inner surface and being opposite to the opening. The stationary block is fixed on the bottom end of the tightening recess and has an oblique surface and a fastener hole. The fastener hole is defined in the oblique surface. The tightening block is mounted slidably on the oblique surface and has a tightening surface, a through hole and a fastener. The tightening surface is shaped to correspond to the inner surface of the tubular body. The through hole is defined through the tightening block. The fastener is mounted through the through hole engages the fastener hole. Therefore, the stationary block and the tightening block are concealed in the tightening recess for improved safety and aesthetic appearance.

Other objects, advantages and novel features of the invention will become more apparent from the following detailed description when taken in conjunction with the accompanying drawings.

DETAILED DESCRIPTION OF PREFERRED EMBODIMENT

Figure 1:
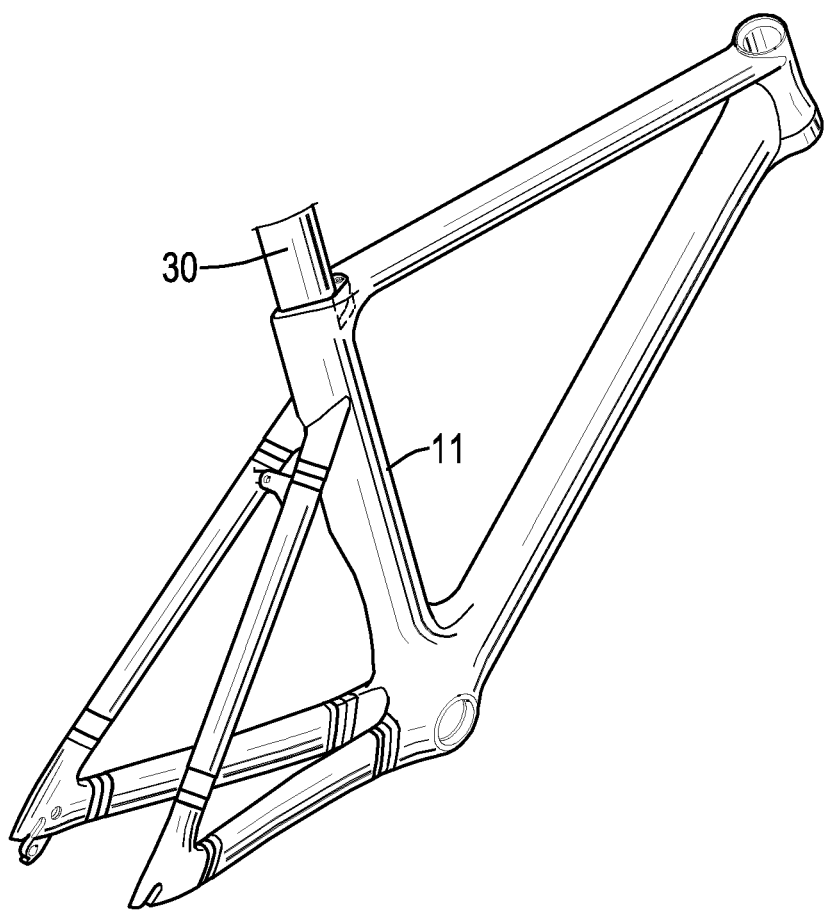
FIG. 1 is a perspective view of a bicycle frame with a first embodiment of a seat tube in accordance with the present invention.
Figure 2:
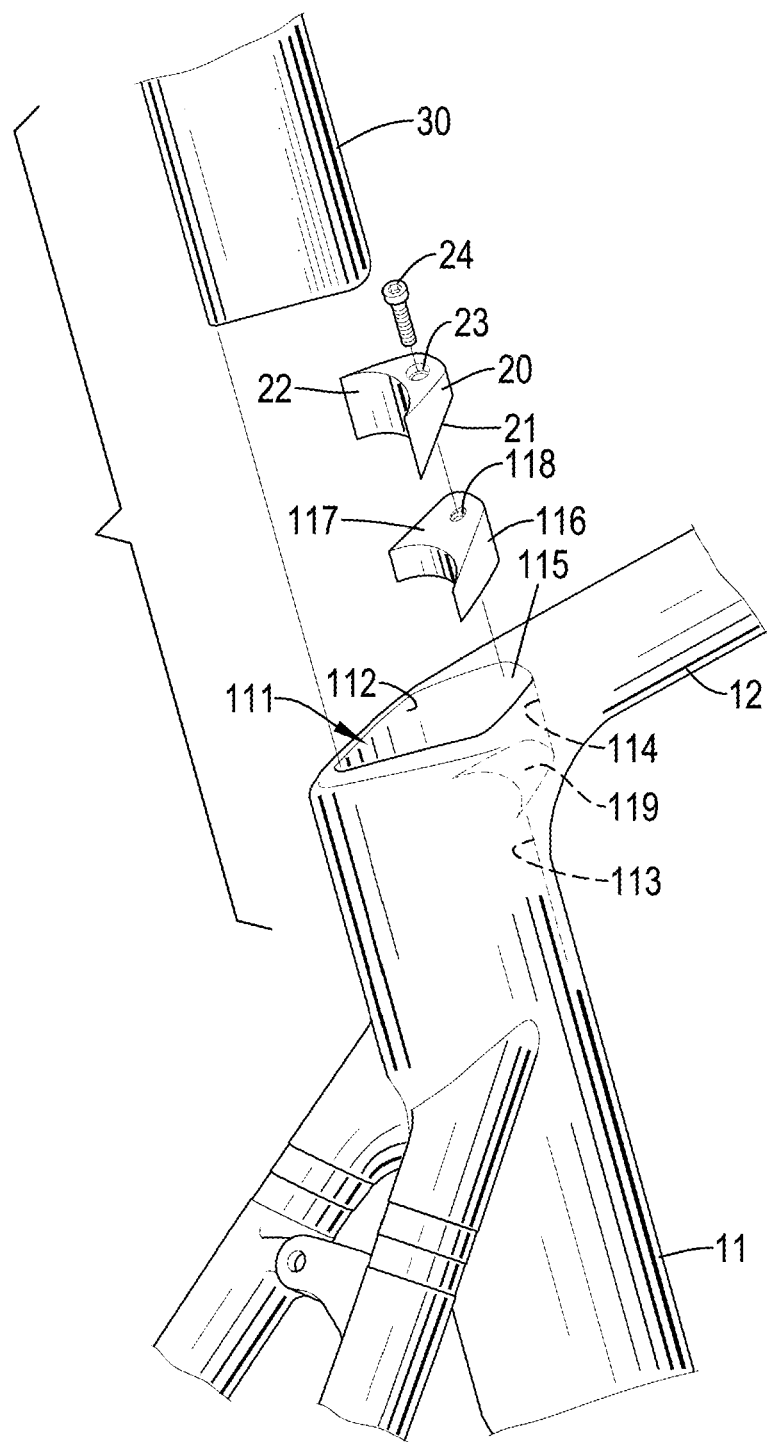
FIG. 2 is an enlarged partially exploded perspective view of the seat tube in FIG. 1.
Figure 3:
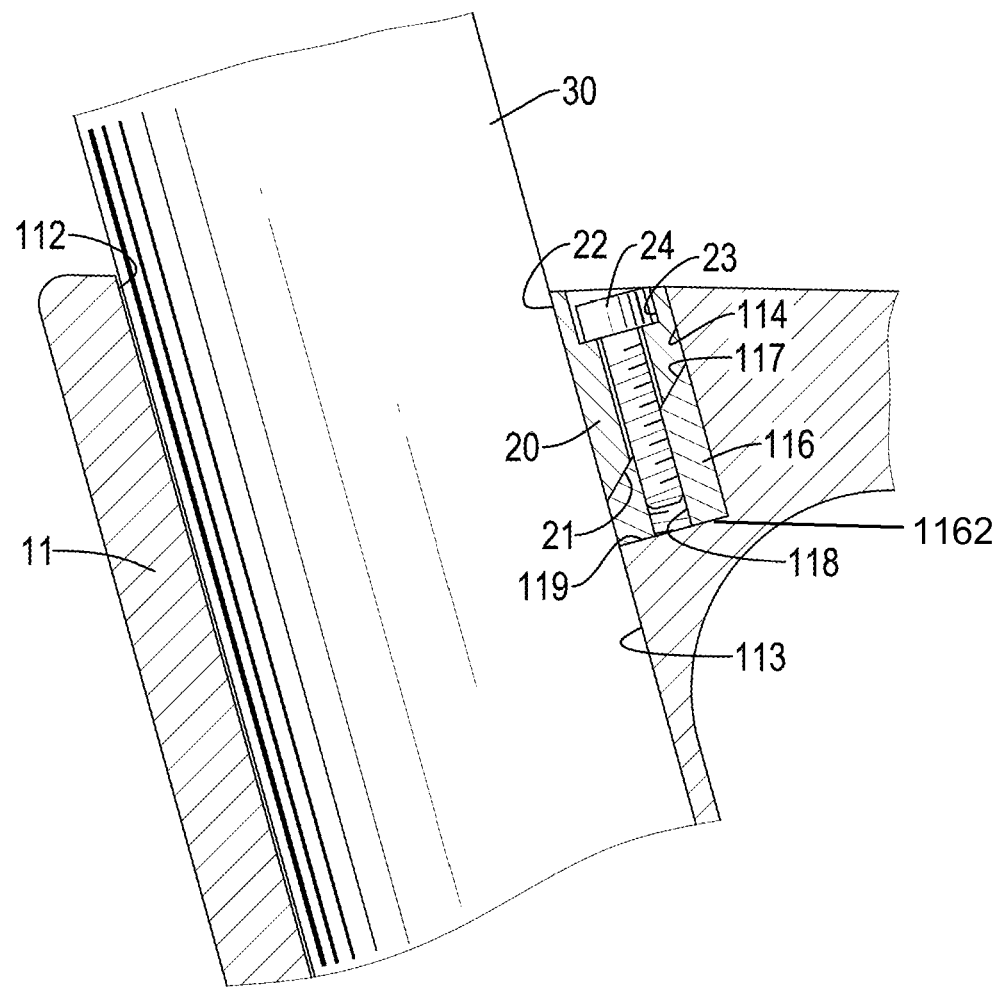
FIG. 3 is an enlarged side view in partial section of the seat tube in FIG. 1.
Figure 4:
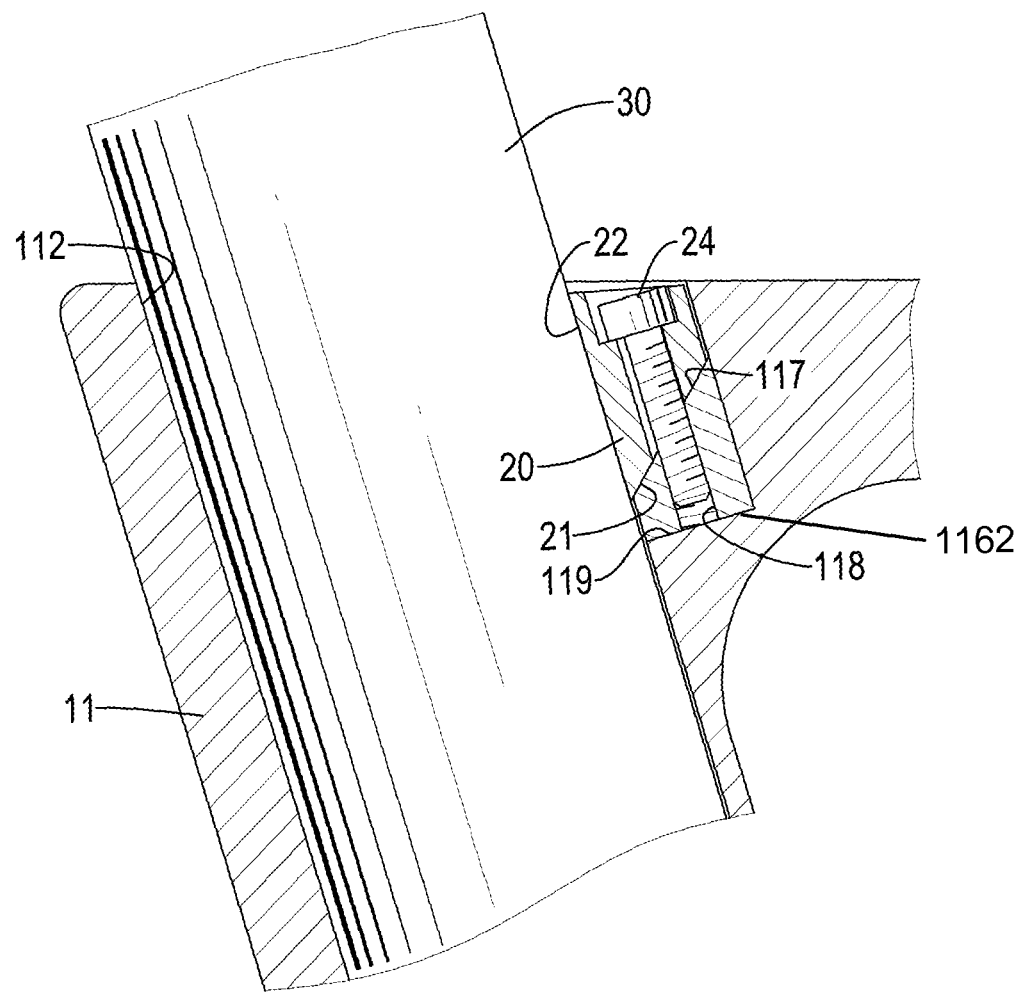
FIG. 4 is an enlarged operational side view in partial section of the seat tube in FIG. 1.
Figure 5:
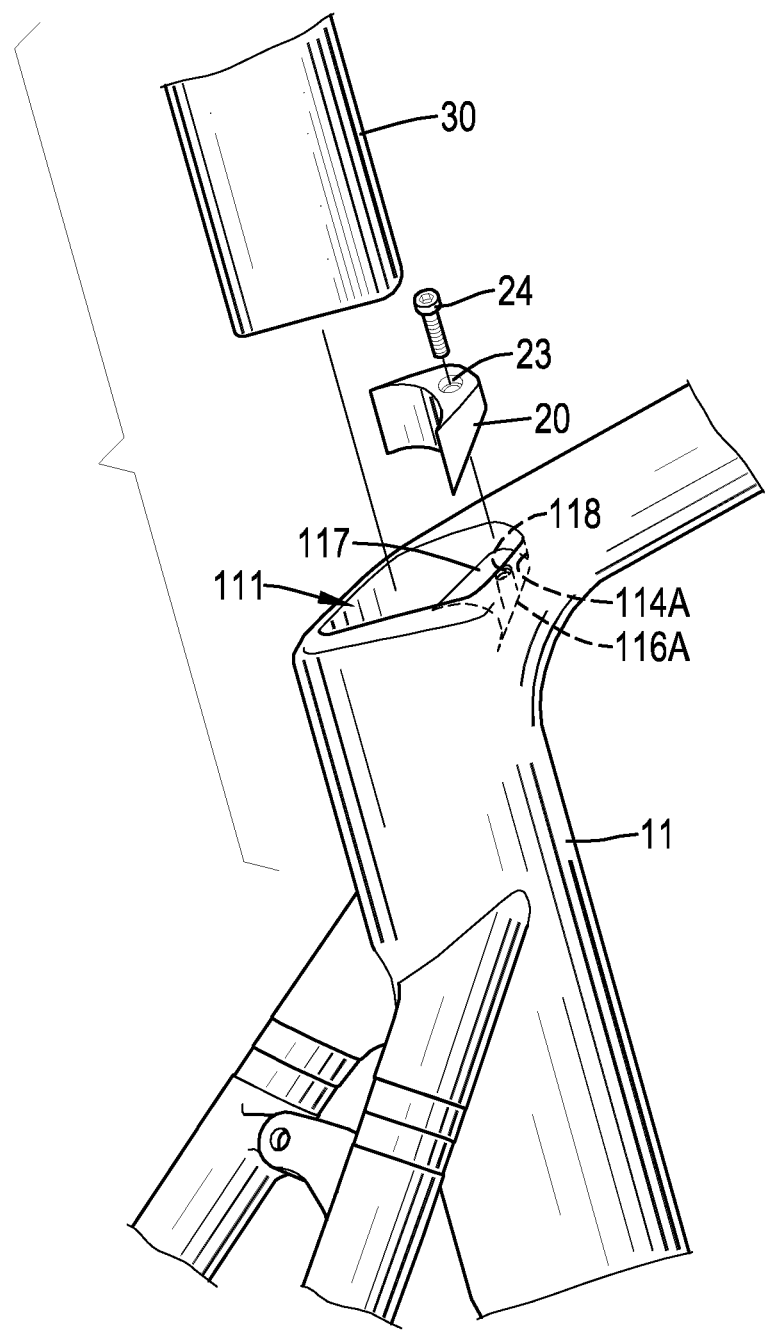
FIG. 5 is a partially exploded perspective view of a bicycle frame with a second embodiment of a seat tube in accordance with the present invention.

With reference to FIGS. 1 and 2, a seat tube of a bicycle in accordance with the present invention comprises a tubular body (11) and a tightening block (20). The tubular body (11) has a top end, an insertion hole (111) and a stationary block (116). The insertion hole (111) may be square or preferably fan-shaped, is axially defined in the top end of the tubular body (11) and has two sides, a V-shaped surface (112), an inner surface (113) and a tightening recess (114). The V-shaped surface (112) is formed on one of the sides of the insertion hole (111). The inner surface (113) may be curved, is formed on the other sides of the insertion hole (111) and is opposite to the V-shaped surface (112). The tightening recess (114) is recessed in the inner surface (113) at the top end of the tubular body (11) and has an opening (115) and a supporting surface (119). The opening (115) is formed on the top end of the tubular body (11). The supporting surface (119) is radially formed on the inner surface (113) of the tubular body (11) and is opposite to and spaced from the opening (115). The stationary block (116) is embedded in the tightening recess (114), may be fixed on and supported by the supporting surface (119) of the tightening recess (114), welded, adhered or formed in tightening recess (114) and has an inner end, an outer end, an oblique surface (117) and a fastener hole (118). With reference to FIG. 5, the stationary block (116A) may be formed integrally on a supporting surface of the tightening recess (114A) opposite to the opening. The inner end is shaped to correspond to the inner surface (113), may be concave, faces the insertion hole (111) and has a thickness. The outer end is opposite to the inner end and has a thickness larger than that of the inner end. The oblique surface (117) is defined in the top of the stationary block (116). The fastener hole (118) is defined in the oblique surface (117). The stationary block (116) has a bottom (1162) abutting with and supported by the supporting surface (119) of the tightening recess (114). The tightening block (20) is embedded in the tightening recess (114), is mounted slidably on the stationary block (116) and has a sliding surface (21), a tightening surface (22), a through hole (23) and a fastener (24). The sliding surface (21) is shaped obliquely, abuts with and is mounted slidably on the oblique surface (117) of the stationary block (116). The tightening surface (22) is concave and is shaped to correspond to the inner surface (113). The through hole (23) is defined through the tightening block (20). The fastener (24) is mounted through the through hole (23) and engages the fastener hole (118) of the stationary block (116) and has a fastener head abutting against the tightening block (20). In the preferred embodiment, the through hole (23) may be elongated or have a diameter larger than that of the fastener (24) to allow the tightening block (20) to move relative to the fastener (24).

With reference to FIGS. 1 to 4, a seat post (30) having a cross section corresponding to that of the insertion hole (111) is inserted into the insertion hole (111) of the tubular body (11) via the top end of the tubular body (11). With the non-circular cross section of the insertion hole (111), the seat post (30) in the insertion hole (111) is not rotatable. Then, a height of the seat post (30) is adjusted to a desired level, and the fastener (24) is rotated to make the fastener head abutting against and pressing onto the tightening block (20), Consequently, the tightening block (20) is moved to abut and tighten the seat post (30) by the tightening surface (22) with the oblique sliding surface (21) sliding along the oblique surface (117) of the stationary block (116). Therefore, the seat post (30) can be held stably in position relative to the tubular body (11). Additionally, because the stationary block (116) and the tightening block (20) are concealed in the tightening recess (114), injuries are prevented to improve safety as well as aesthetic appearance.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A seat tube of a bicycle comprising:
    a tubular body having
        a top end;
        an insertion hole axially defined in the top end of the tubular body and having an inner surface formed in the insertion hole;
        a tightening recess recessed in the inner surface at the top end of the tubular body and having
            an opening formed on the top end of the tubular body; and
            a supporting surface radially formed on the inner surface of the tubular body and being opposite to and spaced from the opening;
        a stationary block fixed on and supported by the supporting surface of the tightening recess and having
            a top;
            an inner end shaped corresponding to the inner surface, facing the insertion hole and having a thickness;
            an outer end having
                a thickness larger than that of the inner end;
                an oblique surface defined in the top of the stationary block;
                a fastener hole defined in the oblique surface; and
            a bottom being opposite to the top of the stationary block and abutting with and supported by the supporting surface of the tightening recess;
        a tightening block embedded in the tightening recess, mounted slidably on the stationary block, shaped corresponding to the tightening recess and having
            a sliding surface shaped obliquely, abutting and mounted slidably on the oblique surface of the stationary block;
            a tightening surface shaped corresponding to the inner surface;
            a through hole defined through the tightening block:
            a fastener mounted through the through hole and engaging the fastener hole of the stationary block and having
                a fastener head abutting against the tightening block.

2. The seat tube of a bicycle as claimed in claim 1, wherein the stationary block is formed on the supporting surface of the tightening recess.

3. The seat tube of a bicycle as claimed in claim 1, wherein the insertion hole is fan-shaped and has
    two sides;
    a V-shaped surface formed on one of the sides of the insertion hole; and
    the inner surface is curved, is formed on the other side of the insertion hole and is opposite to the V-shaped surface.

4. The seat tube of a bicycle as claimed in claim 2, wherein the insertion hole is fan-shaped and has
    two sides;
    a V-shaped surface formed on one of the sides of the insertion hole; and
    the inner surface is curved, is formed on the other side of the insertion hole and is opposite to the V-shaped surface.

* * * * *